US005745610A

United States Patent [19]
Johnson

[11] Patent Number: 5,745,610
[45] Date of Patent: Apr. 28, 1998

[54] DATA ACCESS BASED ON HUMAN-PRODUCED IMAGES

[75] Inventor: Walter A. L. Johnson, Santa Clara, Calif.

[73] Assignee: Xerox Corporation, Stamford, Conn.

[21] Appl. No.: 543,232

[22] Filed: Oct. 13, 1995

Related U.S. Application Data

[63] Continuation of Ser. No. 96,198, Jul. 22, 1993, abandoned.

[51] Int. Cl.$^6$ ........................................... G06K 9/03
[52] U.S. Cl. ..................... 382/309; 353/403; 353/462; 379/100
[58] Field of Search ........................ 382/309, 311; 358/403, 436, 440, 462, 464; 379/100

[56] References Cited

U.S. PATENT DOCUMENTS

| | | | |
|---|---|---|---|
| 4,893,333 | 1/1990 | Baran et al. | 379/100 |
| 4,943,868 | 7/1990 | Yoshinaga et al. | 358/403 |
| 5,010,500 | 4/1991 | Makkuni et al. | 364/521 |
| 5,060,980 | 10/1991 | Johnson et al. | 283/70 |
| 5,084,769 | 1/1992 | Miura | 358/403 |
| 5,099,340 | 3/1992 | Kamada et al. | 358/403 |
| 5,126,858 | 6/1992 | Kurogane et al. | 358/450 |
| 5,148,522 | 9/1992 | Okazaki | 395/161 |
| 5,201,011 | 4/1993 | Bloomberg et al. | 382/9 |
| 5,239,590 | 8/1993 | Yamamoto | 382/4 |
| 5,251,263 | 10/1993 | Döhle et al. | 382/3 |
| 5,265,242 | 11/1993 | Fujisawa et al. | 395/600 |
| 5,267,303 | 11/1993 | Johnson et al. | 358/468 |
| 5,282,052 | 1/1994 | Johnson et al. | 358/402 |
| 5,301,044 | 4/1994 | Wright | 358/500 |
| 5,363,214 | 11/1994 | Johnson | 358/462 |
| 5,406,384 | 4/1995 | Sakuragi | 385/403 |
| 5,448,375 | 9/1995 | Cooper et al. | 358/403 |
| 5,465,167 | 11/1995 | Cooper et al. | 358/468 |

FOREIGN PATENT DOCUMENTS

| | | | |
|---|---|---|---|
| 283267 A2 | 9/1988 | European Pat. Off. | G06F 15/40 |
| 506469 A2 | 9/1992 | European Pat. Off. | H04N 1/00 |
| 543590 A2 | 5/1993 | European Pat. Off. | G06K 9/80 |
| 543594 A2 | 5/1993 | European Pat. Off. | G06K 9/32 |
| 561606 A1 | 9/1993 | European Pat. Off. | H04N 1/21 |
| 63-95578 | 4/1988 | Japan | G06F 15/40 |
| 63-242060 | 10/1988 | Japan | H04N 1/21 |
| 41835 | 1/1992 | Japan | G06F 12/00 |
| 4125773 | 4/1992 | Japan | G06F 15/40 |

OTHER PUBLICATIONS

European Search Report and Annex, Application No. EP 94 30 5355, Oct. 21, 1994.

Hamano, T., "A similarity Retrieval Method for Image Databases Using Simple Graphics," *IEEE Workshop on Languages for Automation*, College Park, Md., Aug. 29–31, 1988. pp. 149–154.

(List continued on next page.)

*Primary Examiner*—Jose L. Couso
*Assistant Examiner*—Matthew Bella

[57] ABSTRACT

An item of data, such as data defining an image of a document, and identifying image data are stored in memory. The identifying image data define a human-produced identifying image for the item of data. In response to query image data defining a human-produced query image similar to the identifying image, the query image data and the identifying image data are used to access the item of data. The identifying image and query image can be produced making marks by hand, by controlling a machine to make marks, or by interactively using a machine to produce data defining an image. The identifying image can be in a field on a form requesting a store operation, and the form can be part of an image set that includes images of a document that the identifying image identifies. Similarly, the query image can be in a field on an access form requesting an access operation. In response to the access form, a machine can automatically create a retrieval request form listing identifying images that are sufficiently similar to the query image to meet a criterion. In response to the marked retrieval request form, the machine can access and retrieve each requested document.

46 Claims, 12 Drawing Sheets

OTHER PUBLICATIONS

Huttenlocher, D.P., Rucklidge, W.J., and Klanderman, G.A., "Comparing Images Using the Hausdorff Distance Under Translation," *IEEE Proceedings CVPR '92*, Jun. 15–18, 1992, Champaign, Illinois, pp. 654–656.

*Using PaperWorks™ on a PC.*, Xerox Corporation, 1992, pp. 1–4 and 71–86.

*Using PaperWorks™ from a FAX Machine.*, Xerox Corporation, 1992, pp. 1–50.

Johnson, W., Jellinek, H., Klotz Jr., L., Rao, R., Card, S., "Bridging the Paper and Electronic Worlds: The Paper User Interface," *INTERCHI '93 Conference Proceedings*, Apr. 24–29, 1993, pp. 507–512.

Huttenlocher, D. P., Klanderman, G. A., and Rucklidge, W. J., "Comparing Images Using the Hausdorff Distance," Cornell University Department of Computer Science, CUCS TR 91–1211 (revised), 1991, pp.1–35.

A document bearing Application No. HEI2–246776 and Laid–Open Date Apr. 27, 1992.

A document bearing Application No. HEI2–104017 and Laid–Open Date Jan. 7, 1992.

Imagio MF530 Model 3 sales brochure, Ricoh K. K., Jan. 1993, four pages, with English translation, pp. 1–27.

"NEC Is Developing System To Search Files for Images," *The Asian Wall Street Journal Weekly*, Apr. 19, 1993, p. 8.

Kramer, M., "Windows–Based Fax Tools Deliver More than Just the Fax—Cardiff's Teleform Eases Remote Data Entry," *PC Week*, Mar. 30, 1992, p. 14.

DATA ACCESS BASED ON HUMAN-PRODUCED IMAGES

This is a continuation of application Ser. No. 08/096,198, filed Jul. 22, 1993, now abandoned.

BACKGROUND OF THE INVENTION

The present invention relates to data filing techniques.

*Using PaperWorks™ on a PC.*, Xerox Corporation, 1992, pp. 1–4 and 71–86, describes document handling features of PaperWorks™ software, a product of Xerox Corporation. Page 2 indicates that the software stores a document as an electronic image and that a document from a personal computer (PC) can be delivered to a fax machine, whether a document faxed to the PC or a version of a document created on the PC. Page 73, near the bottom, shows an image of a window entitled "Marketing Reports" within which an image of a name that had been written on a form is shown for a document sent to a PC from a fax machine. Page 79 indicates that such a document can be renamed. Pages 82–83 show how a DOS document is included.

*Using PaperWorks™ from a Fax Machine.*, Xerox Corporation, 1992, also describes document handling features of the PaperWorks™ software. Page 1 indicates that a user can retrieve documents from a personal computer from a fax machine, whether a document faxed to the PC or a version of a document created on the PC. Pages 9–11 illustrate forms used to retrieve documents, and explain how to mark the forms to retrieve a document. Pages 20–23 illustrate forms used to file a document on a PC from a fax machine, and page 21 shows a form in which a user can write a name for a document.

The PaperWorks™ software manages documents using a database. Each document is assigned an identifier within the database, and this identifier can be used to access the document. In addition, the document can have an identifying image in the database, stored so that the document identifier can be used to access the identifying image and vice versa. In automatically creating a retrieval form, the software can use the document identifier to access the identifying image and can then include the identifying image in the form with a check box. If an image of the form is subsequently received with the check box marked, the software can use a description of the form to access the document identifier, and can then use the document identifier to access the document and perform the requested retrieval operation.

SUMMARY OF THE INVENTION

One aspect of the invention is based on the observation of problems with conventional data filing techniques. A system that performs data storing and retrieval operations must have a way of selecting a stored item of data for access. Conventionally, an item of data can be stored in such a way that it can be accessed based on an identifier that includes ASCII codes or other character codes.

Conventional techniques for providing ASCII codes or other character codes to a filing system can be problematic in certain situations. If the codes are obtained directly, such as by pressing keys of a keyboard, the filing system must have user input circuitry for receiving such codes; in this case, a remote user able to communicate only through a facsimile machine, for example, would have difficulty retrieving items of data. On the other hand, if the codes are obtained indirectly through handprint recognition or other recognition techniques, errors in recognition may make it difficult to access a desired item of data.

Some conventional techniques use file identifiers that are automatically generated by a filing system, such as strings of ASCII codes or other character codes. In addition to the problems noted above, these techniques are problematic because an automatically generated identifier may not include information that suggests the content of an item of data to a user.

This aspect is based on the discovery of a technique that alleviates these problems by enabling a user to access a stored item of data by providing a human-produced query image. The query image could be produced, for example, by hand printing, hand writing, drawing, typewriting, machine printing, or interactive image creation or editing. Therefore, the query image can have an appearance that suggests the content of a desired item of data to the user. Because the stored item of data can be accessed using the human-produced query image, it is unnecessary to obtain ASCII codes or other character codes.

This technique can be implemented, for example, by storing data, referred to herein as "identifying image data," defining an identifying image for a stored item of data. Then, in response to query image data defining a query image similar to the identifying image, the query image data and the identifying image data can be used to access the stored item of data.

The query image data and the identifying image data can be used, for example, to determine that the query image and the identifying image are similar. The identifying image data and the stored item of data can be stored so that the item of data can be accessed from the identifying image data. One way to do so is to register the identifying image data and the item of data in a filing system, in a database, or in a data structure such as a lookup table such that when data is used to access identifying image data, data is also available to access the identified item of data.

The identifying image data can include data defining each pixel of the identifying image, such as a bitmap. In this case, the identifying image and the query image could be compared by a correlation operation, such as by obtaining a Hausdorff distance.

The identifying image data can include a less detailed descriptor of the identifying image in a form that facilitates comparison. For example, the descriptor can be a one-dimensional signal descriptor of the identifying image. A descriptor of the query image can similarly be obtained from the query image data, and a comparison can then be performed using the two descriptors.

The comparison could be performed to obtain the item of data whose identifying image is most similar to the query image. Or the comparison could be performed to obtain any item of data whose identifying image is sufficiently similar to the query image to meet a criterion.

If more than one stored identifying image is sufficiently similar to the query image to meet a criterion, the identifying images can be used to permit a user to select between the items of data they identify. For example, a form can be created automatically, showing each identifying image next to a check box. Each check box can then be marked to request retrieval of the item of data identified by the adjacent identifying image.

A machine implementing the invention can include image input circuitry and memory. Data defining an item of data and defining an identifying image for the item of data can be stored in the memory. Data defining a query image can be received from the image input circuitry. The data defining the query image and the identifying image can then be used to access the item of data.

A software product implementing the invention can include a storage medium and data stored by the storage medium. The software product can be used in a machine that includes an item of data and its identifying image data stored in memory. The stored data can include instructions that can be executed by the machine's processor. In executing the instructions, the processor receives data defining a query image from image input circuitry and uses the data defining the query image and the identifying image to access the item of data.

The techniques described above are advantageous because they make it unnecessary to employ ASCII codes or other character codes in data access. Instead, human-produced query images can be used, such as handprinted images. The techniques are also advantageous because they make it possible for the user to provide an identifying image that suggests the content of an item of data it identifies; as a result, the user can more easily remember the identifying image.

The following description, the drawings, and the claims further set forth these and other aspects, objects, features, and advantages of the invention.

DETAILED DESCRIPTION

A. Conceptual Framework

Figure 1:
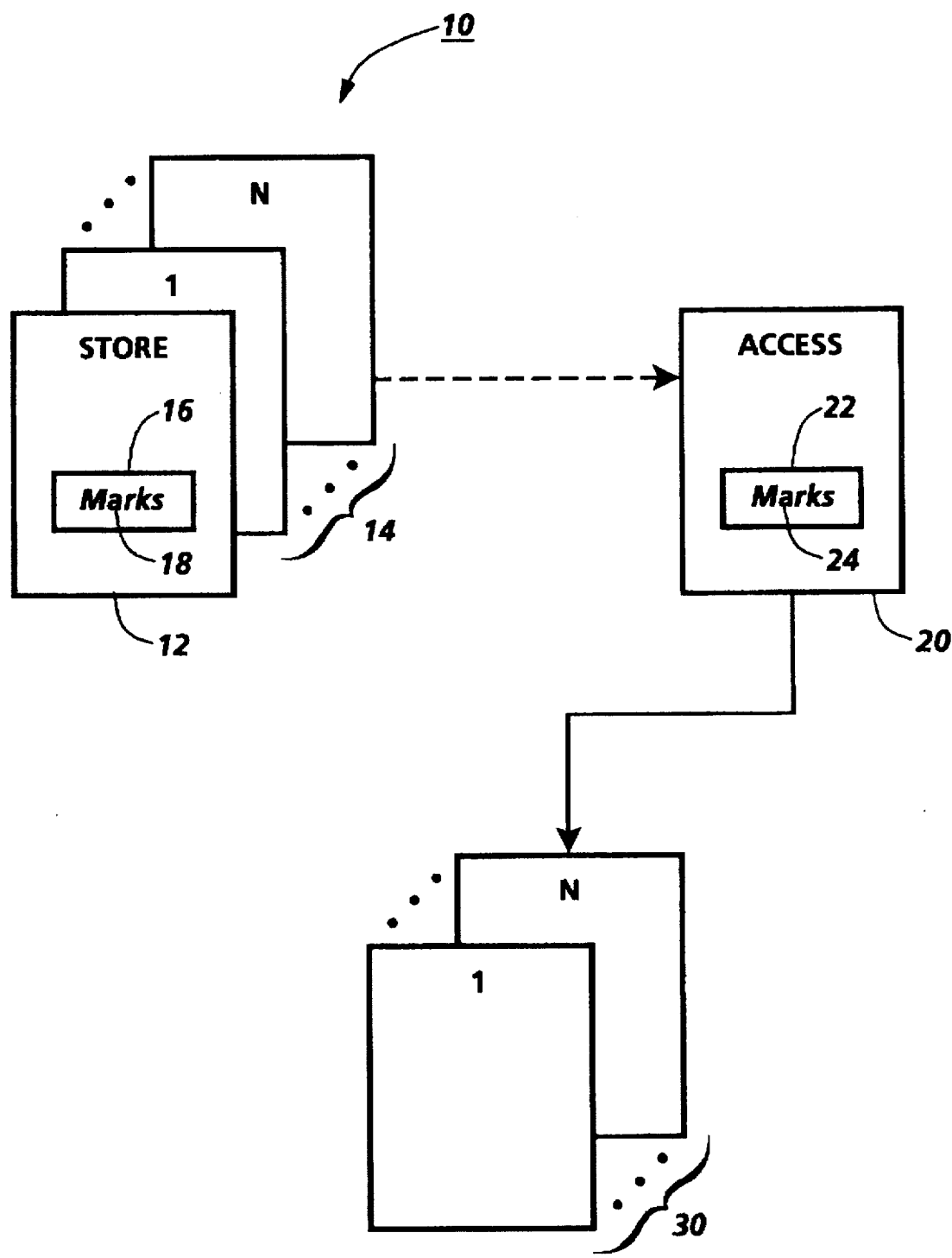
FIG. 1 is a schematic diagram illustrating how human-produced images can be used to access an item of data.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" a one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

A "descriptor" of an image is an item of data that includes information about the image but not sufficient information to produce the image. For example, a descriptor could be a one-dimensional signal descriptor.

An operation "compares" data defining two images if the operation uses the data to determine that the images are similar or to determine that the images are not similar. For example, comparing data defining two images can include comparing pixel data that indicate values for pixels in the image, such as by obtaining data indicating a Hausdorff distance or other measure of correlation. Or comparing data defining two images can include using the data defining each image to obtain a descriptor and then comparing the descriptors.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

The term "mark" includes a single mark and also plural marks that together form a pattern of marks.

A "human-produced image" is an image that is produced under control of a human. The human could make marks by hand to produce the image. Marks could be made by a machine under control of the human to produce the image. The human could perform actions such as mouse and keyboard clicks to cause a machine to execute instructions to produce data defining the image, which could then be provided to a printer, a fax machine, a display, a network for transmission, and so forth.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

An image "shows" a page, such as a page of a form or a sheet, when the image is an image of the page. An image set "shows" a page when the image set includes one or more images that, separately or in combination, show the page. An item of data "defines" a page when the item defines an image set that shows the page.

A "version" of a first image is a second image produced using an item of data defining the first image. The second image may be identical to the first image, or it may be modified by loss of resolution, by changing the data defining the first image, or by other processes that result in a modified version.

A "marked version" of a form is the form with a mark in one of its fields.

An operation "creates" a page, such as a page of a form or a sheet, when the operation produces an item of data defining the page.

Each location in an image may be called a "pixel." In an array defining an image in which each item of data provides a value, each value indicating the color of a location may be called a "pixel value".

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "character type" is a category of which a character may be an instance, such as the letter "a" or the number "3". A "version of a character type made by a human by hand" is a set of one or more marks made by the human by hand that are intended to be an instance of the character type.

An operation "recognizes" marks if the operation uses data defining an image of the marks to obtain data indicating a character type or other category of which the marks are likely to be an instance. An operation is performed "without recognizing" marks if the operation does not include obtaining data indicating a character or other category of which the marks are likely to be an instance.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

B. General Features

Figure 2:
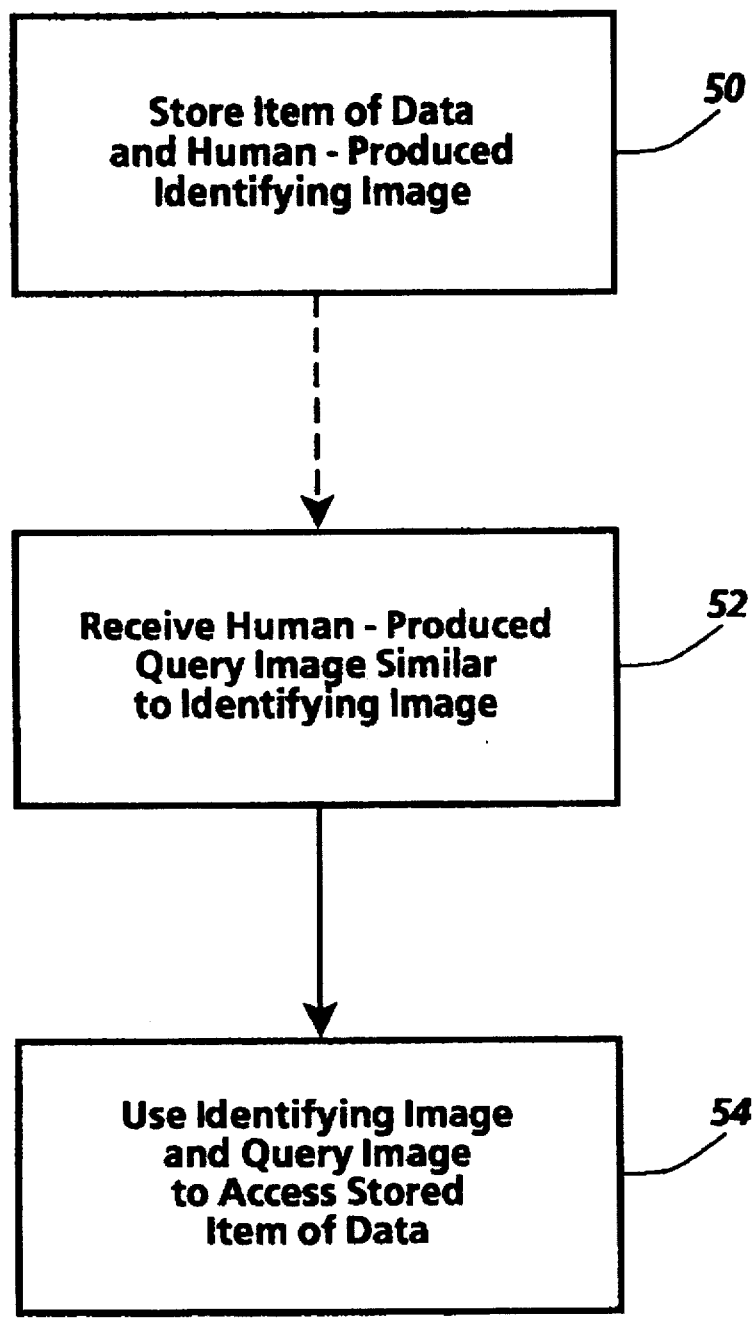
FIG. 2 is a flow chart showing general steps in using a human-produced query image to access an item of data.
Figure 3:
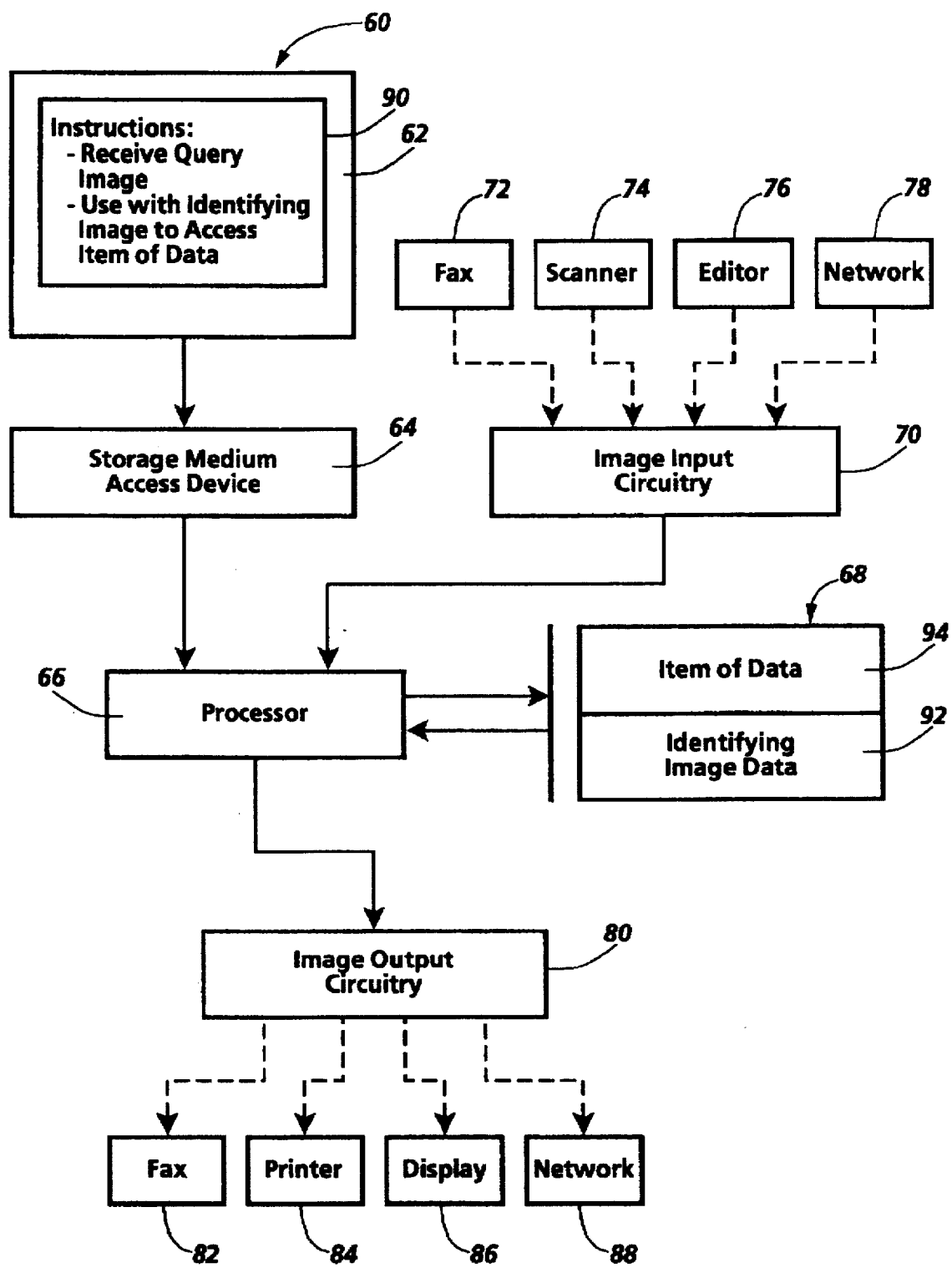
FIG. 3 is a schematic block diagram showing general components of a software product and a machine in which the software product can be used to implement the general steps in FIG. 2.

FIGS. 1–3 illustrate general features of the invention. FIG. 1 shows graphically how an identifying image and a query image can be used to access an item of data. FIG. 2 shows general steps in using a query image to access an item of data. FIG. 3 shows general components of a software product and of a machine in which it can be used.

FIG. 1 shows image set 10, including form 12 and document 14, which includes N pages as shown. Form 12 requests storage of document 14 and also includes field 16 for a human-produced identifying image. As shown, field 16 includes marks 18 made by a human by hand. A machine receiving data defining image set 10 can respond to form 12 by automatically storing an item of data defining document 14 and identifying image data defining an image of field 16.

Form 20 requests access of an item of data and also includes field 22 for a human-produced query image. As shown, field 22 includes marks 24 made by a human by hand which are similar to marks 18 in field 16. Therefore, the machine receiving data defining an image of form 20 can respond by determining whether the identifying image from field 16 is similar to the query image from field 22. If so, the machine can access item of data 30 defining document 14.

The general acts in FIG. 2 begin in box 50 by storing an item of data and by also storing data defining a human-produced identifying image for the item of data. At some later time, as indicated by the dashed line, the act in box 52 receives data defining a human-produced query image that is similar to the identifying image. In response, the act in box 54 uses the data defining the identifying image and the query image to access the item of data stored in box 50.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is also connected for accessing data stored in memory 68.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

Processor 66 is also connected for providing data defining images to image output circuitry 80. The data could in turn be provided to fax machine 82, to printer 84, to display 86, or to network 88.

In addition to data storage medium 62, software product 60 includes data stored by storage medium 62. The stored data include data indicating instructions 90, which processor 66 can execute to perform the acts in boxes 52 and 54 in FIG. 2. In performing the act in box 52, processor 66 receives data defining a query image from image input circuitry 70. In performing the act in box 54, processor 66 uses the data defining the query image and identifying image data 92 to access item of data 94. Identifying image data 92 defines an identifying image for item of data 94.

C. Possible Implementations

The general features described above could be implemented in numerous ways on various machines to provide access to stored items of data.

1. Human-Produced Images

Figure 4:
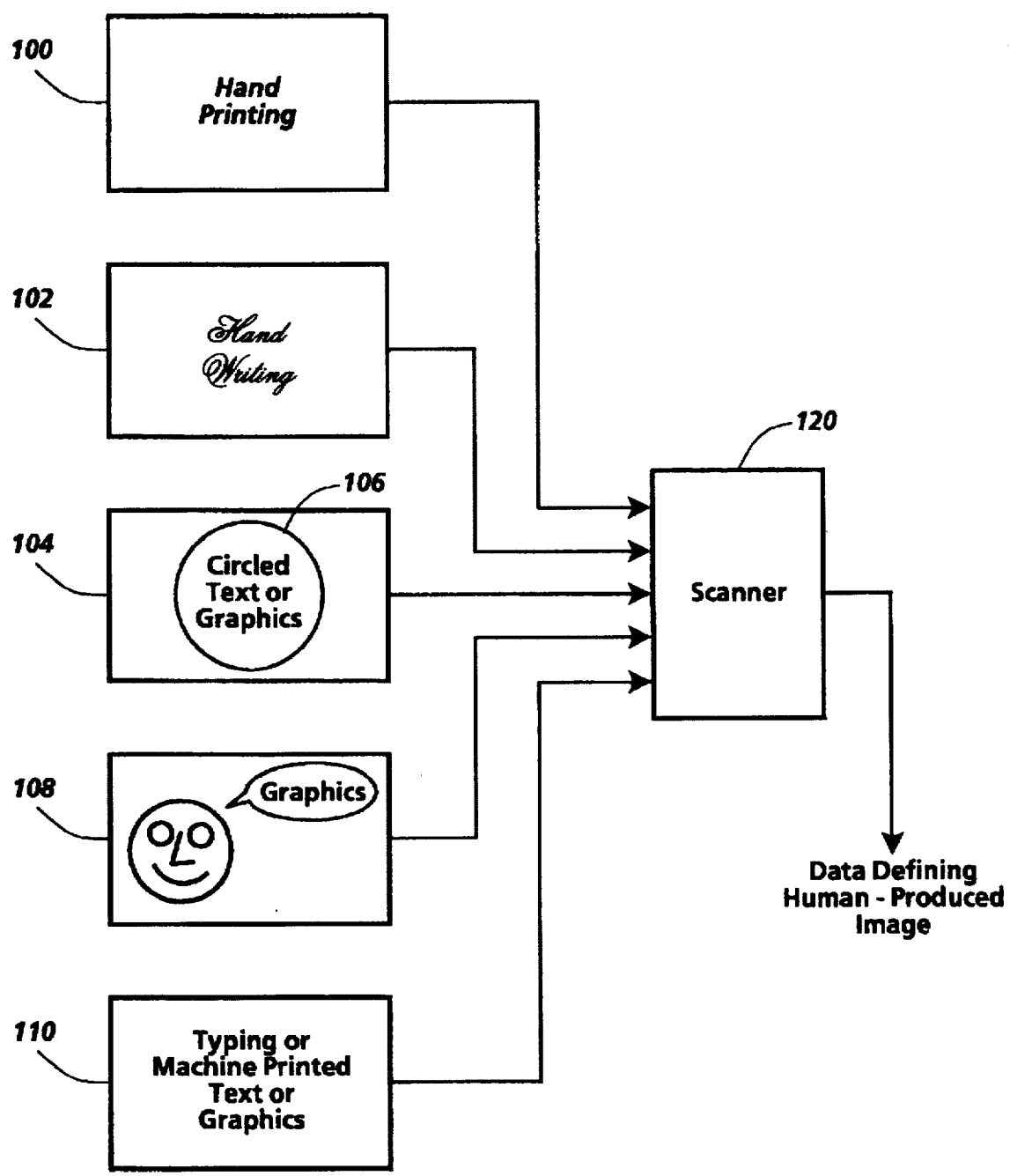
FIG. 4 is a schematic block diagram showing ways in which a human can produce a query image by a marking operation.
Figure 5:
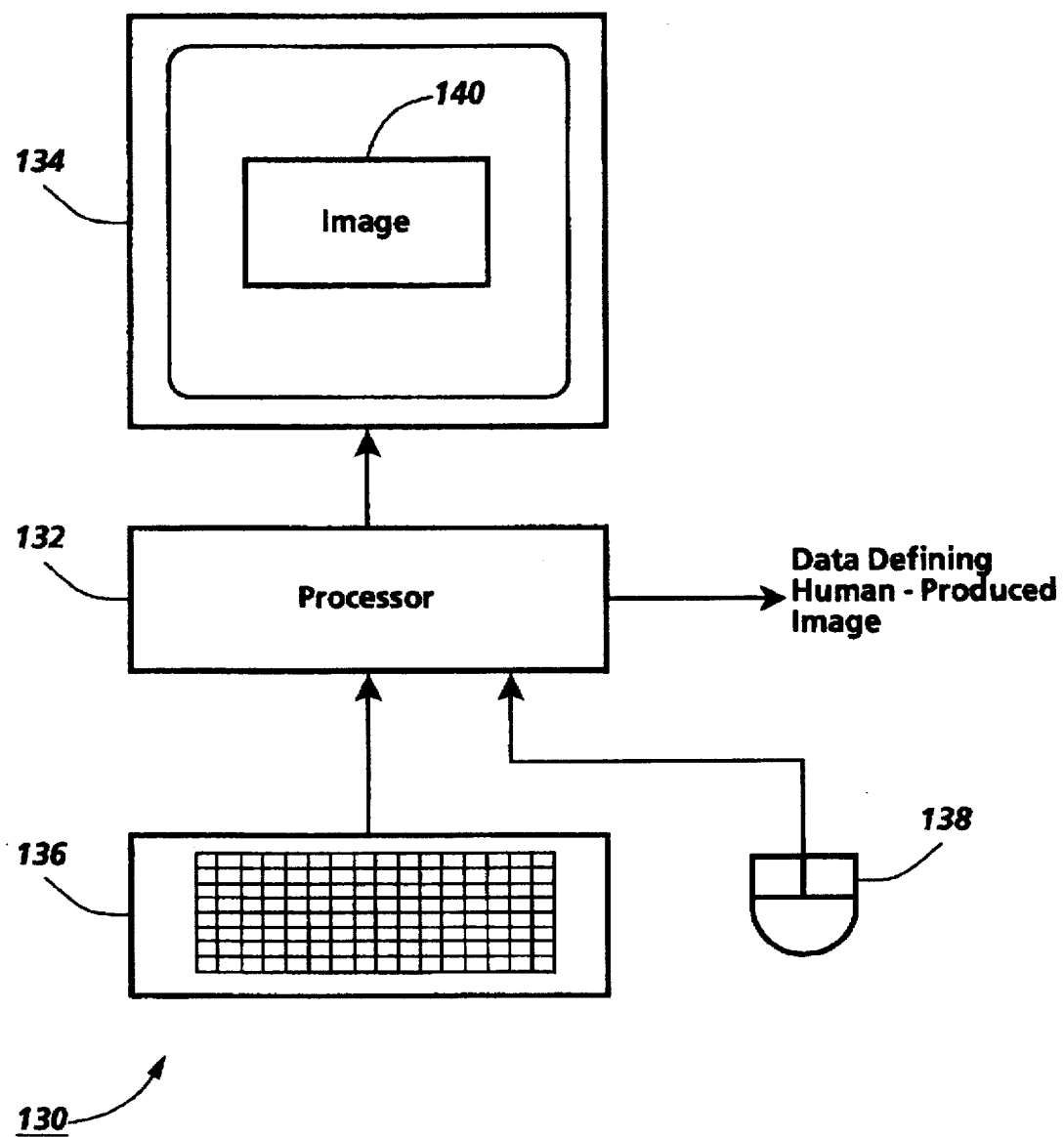
FIG. 5 is a schematic block diagram showing how a human can produce a query image by interacting with a machine.

A user can provide data defining a human-produced image in many ways. FIG. 4 illustrates ways in which a user can provide a human-produced image by a marking operation. FIG. 5 illustrates ways in which a user can provide a human-produced image by interacting with a machine without a marking operation.

In FIG. 4, several examples of human-produced images are shown at left. Image 100 was produced by hand printing, image 102 by hand writing, image 104 by drawing circle 106 around text or graphics, and image 108 by hand drawing graphics. Image 110 was produced by typing or by machine printing text or graphics.

Scanner 120 can receive a sheet holding any of the human-produced images in FIG. 4. In response, scanner 120 provides data defining a human-produced image to be used in a data storage or access operation. For image 104, techniques as described in Bloomberg et al., U.S. Pat. No. 5,201,011, incorporated herein by reference, could be used to detect the marks and extract the region within the circle.

FIG. 5 shows machine 130, which could be a personal computer, a workstation, or another data processing system. Machine 130 includes processor 132, display 134, keyboard 136, and pointing device 138, illustratively a mouse. A user can operate keyboard 136 and pointing device 138 to provide signals to processor 132. In response, processor 132 presents and modifies image 140 on display 134, so that the user can continue to provide signals until image 140 is satisfactory. Then the user can provide a signal requesting that processor 132 provide data defining human-produced image 140 to be used in a data storage or access operation.

Processor 132 could execute a number of types of software to permit a user to produce an image in the manner described above. Processor 132 could execute document editing software or image editing software. Further, processor 132 could have stored images of characters printed by a human by hand, so that, in response to keystrokes on keyboard 136, processor 132 could include hand printed characters in image 140.

In practicing the invention, an identifying image could be produced in one of the ways shown in FIGS. 4 and 5, while a query image could be produced in another one of the ways. For example, a first human could hand print an identifying image and a second human could operate keyboard 136 to include characters printed by the first human in image 140 to provide a query image similar to the identifying image.

2. Storing Identifying Image

Figure 6:
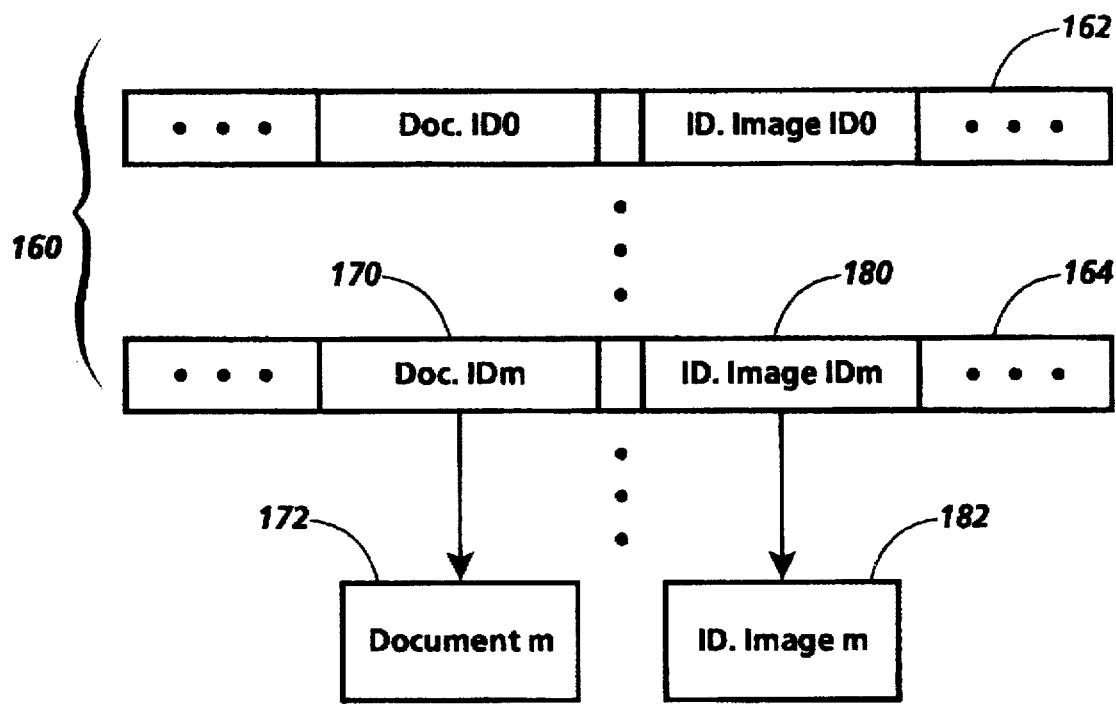
FIG. 6 is a schematic block diagram showing an item and its identifying image stored in a database.
Figure 7:
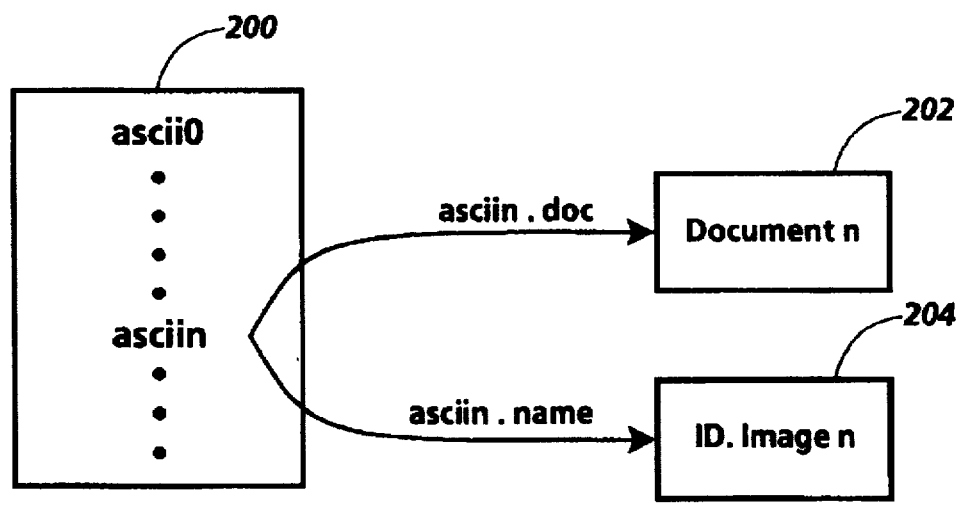
FIG. 7 is a schematic block diagram showing an item and its identifying image stored in a filing system.

An item of data and data defining its identifying image could be stored in various ways. FIG. 6 shows how items and identifying images could be stored in a database. FIG. 7 shows how items and identifying images could be stored in a filing system.

FIG. 6 shows entries in database 160 beginning with zeroth entry 162 and including mth entry 164. FIG. 6 also shows stored data to which mth entry 164 is linked.

As shown, mth entry 164 includes several fields. Document ID field 170 includes a pointer to item of data 172, document m. Identifying image ID field 180 includes a pointer to item of data 182, data defining identifying image m, which identifies document m. As a result, when data, such as from field 180, is used to access identifying image data, such as item of data 182, data, such as from field 170, is also available to access the identified item of data, such as item of data 172.

Figure 11:
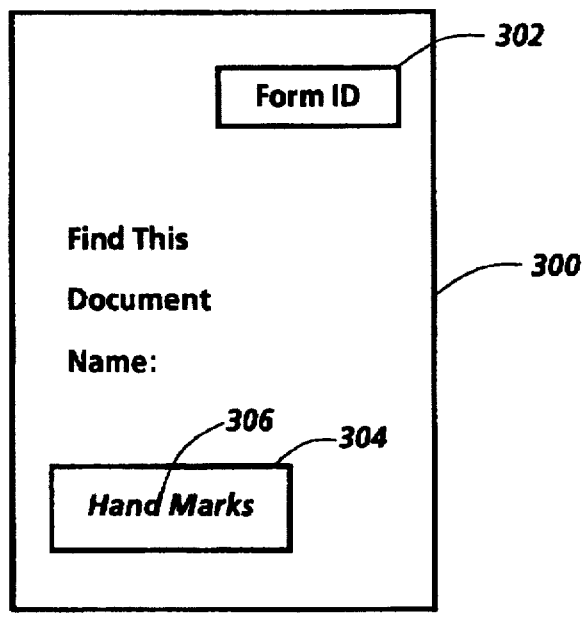
FIG. 11 is a schematic view of a form for requesting access to a document.

The technique illustrated in FIG. 6 could be implemented as described in relation to FIG. 11 of copending coassigned U.S. patent application Ser. No. 07/855,987, now issued as U.S. Pat. No. 5,448,375, entitled "Method and System for Labeling a Document for Storage, Manipulation, and Retrieval", incorporated herein by reference.

FIG. 7 shows directory 200 listing ascii file names in a file system such as Unix, illustratively showing the zeroth name "ascii0" and the nth name "asciin". The suffix ".doc" can be annexed to the nth file name in directory 200 to access item of data 202, document n. Similarly, the suffix ".name" can be annexed to the nth file name to access item of data 204, data defining identifying image n, which identifies document n. As a result, when a file name from directory 200 is used to access identifying image data, such as item of data 204, the file name is also available to access the identified item of data, such as item of data 202.

3. Access Operations

Figure 8:
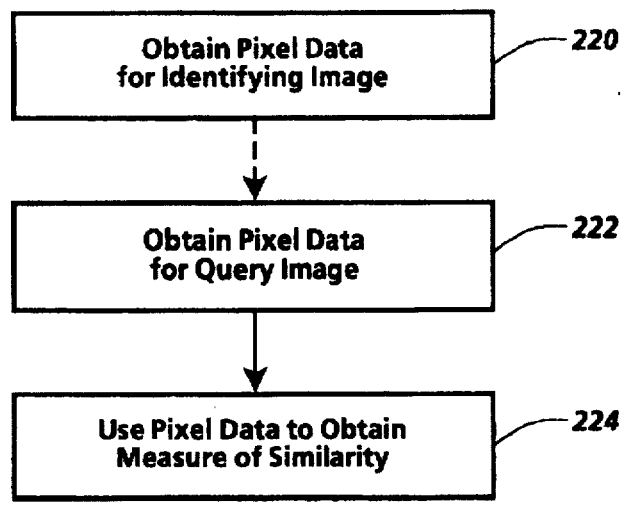
FIG. 8 is a flow chart showing acts in obtaining a measure of similarity using pixel data defining an identifying image and a query image.
Figure 9:
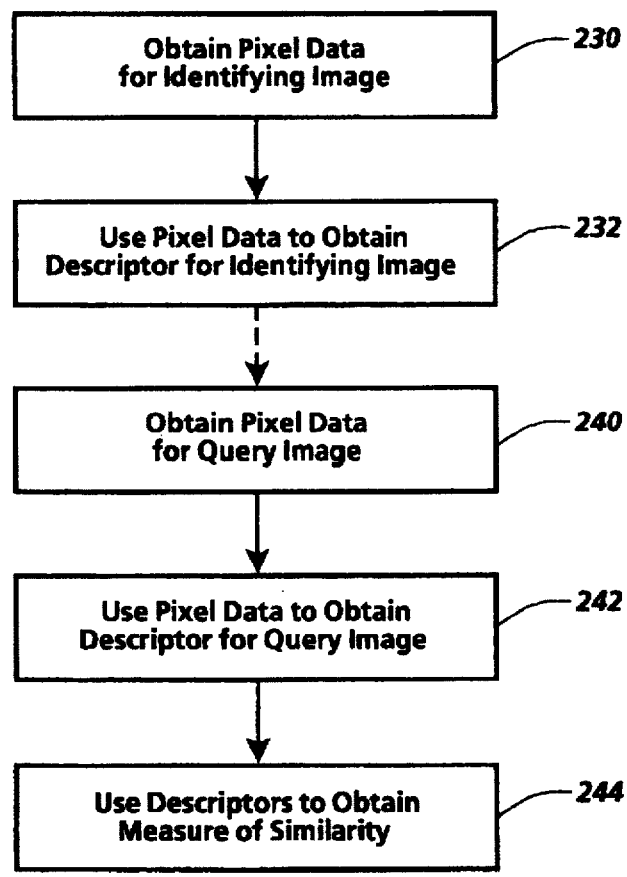
FIG. 9 is a flow chart showing acts in obtaining a measure of similarity using descriptors for an identifying image and a query image.
Figure 10:
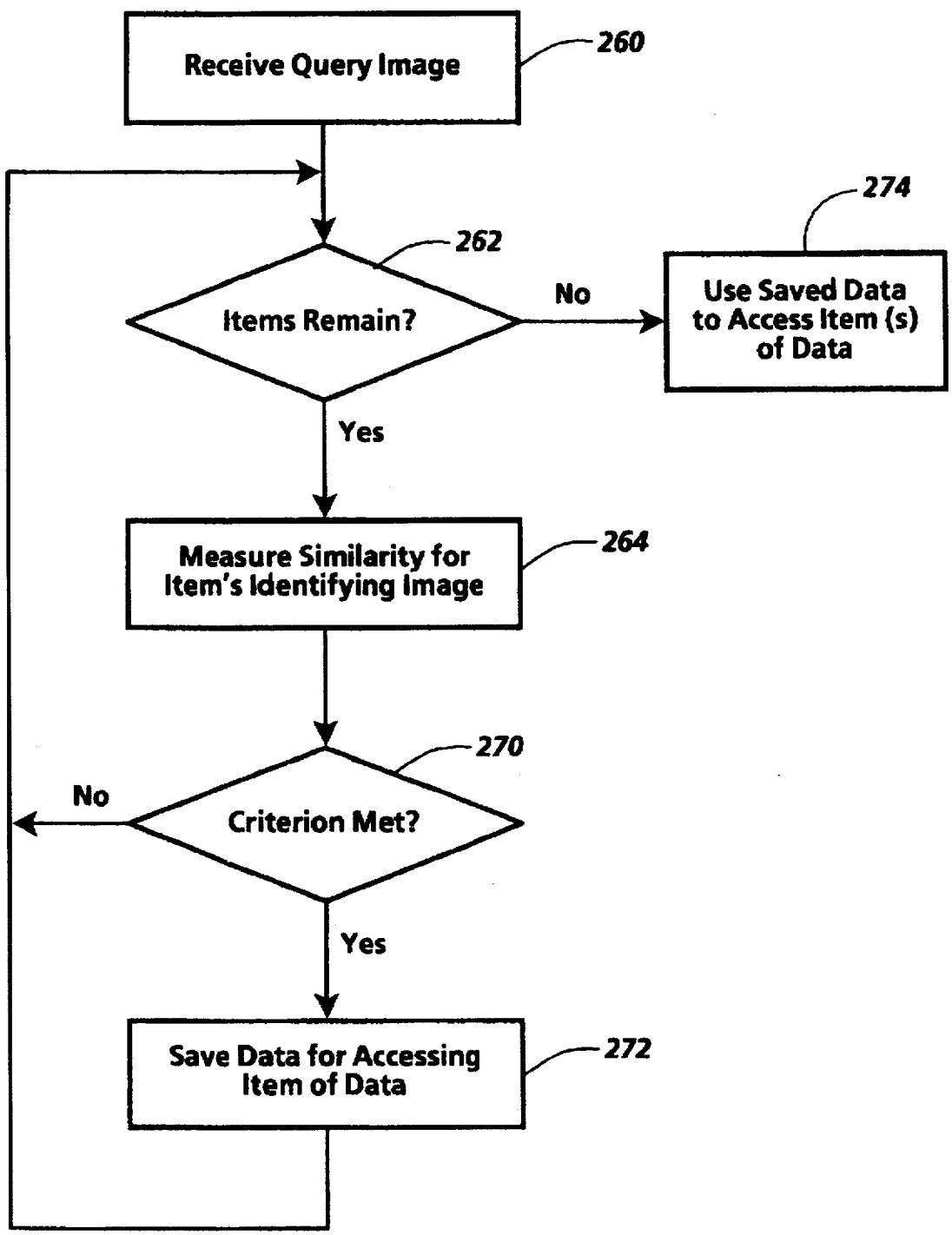
FIG. 10 is a flow chart showing acts in accessing an item of data with an identifying image that is sufficiently similar to a query image to meet a criterion.

Identifying image data and query image data could be used in various ways to access an item of data. FIG. 8 shows acts in an implementation in which pixel data defining an identifying image and a query image are used to obtain a measure of similarity. FIG. 9 shows acts in an implementation in which pixel data are used to obtain descriptors for the identifying image and for the query image and the descriptors are used to obtain a measure of similarity. FIG. 10 shows acts in a routine that can access an item of data based on operations like those in FIGS. 8 and 9.

The act in box 220 in FIG. 8 obtains data indicating a value for each pixel of the identifying image. This act can be performed using data defining an image that includes the identifying image within a field, for example, in which case the pixel data indicate the values of pixels within the field. As suggested by the dashed line in FIG. 8, this act can be performed when the identifying image data is stored, and the pixel data can be included in the identifying image data. This act can also include normalization or any other operations necessary so that the same similarity measurement can be performed on the identifying images of a number of items of data.

The act in box 222 is performed when data defining the query image is received. This act obtains data indicating a value for each pixel of the query image. This act can be performed using data defining an image that includes the query image within a field, for example, in which case the pixel data indicate the values of pixels within the field. This act can also include normalization or any other operations necessary to facilitate measurement of similarity to identifying images.

The act in box 224 then uses the pixel data from boxes 220 and 222 to obtain data indicating a measure of similarity between the identifying image and the query image. For example, a Hausdorff distance or other fuzzy correlation could be obtained between the two images. The use of a Hausdorff distance to compare images is described in Huttenlocher, D. P., Klanderman, G. A., and Rucklidge, W. J., "Comparing Images Using the Hausdorff Distance," Cornell University Department of Computer Science, CUCS TR 91-1211 (revised), 1991, pp. 1–35, incorporated herein by reference.

As in box 220, the act in box 230 in FIG. 9 obtains data indicating a value for each pixel of the identifying image. This act can also include normalization or any other operations necessary so that useful descriptors can be obtained for the identifying images of a number of items of data.

The act in box 232 then uses the pixel data from box 230 to obtain a descriptor of the identifying image. For example, if identifying images are constrained to be words, the descriptor could be a word shape signal such as a one-dimensional signal obtained as described in copending coassigned U.S. patent application Ser. No. 07/794,391, now continued as application Ser. No. 08/242,692, entitled "Method of Deriving Wordshapes for Subsequent Comparison" ("the Deriving Wordshape application"), incorporated herein by reference. As suggested by the dashed line in FIG. 9, this act can be performed when the identifying image data is stored, and the descriptor can be included in the identifying image data. In any event, the pixel data can be included in the identifying image data, so that the descriptor could also be obtained later, such as at the time the query image is received.

The act in box 240 is performed when data defining the query image is received. This act obtains data indicating a value for each pixel of the query image, as in box 222. This act can also include normalization or any other operations necessary a useful descriptor can be obtained.

The act in box 242 then uses the pixel data from box 240 to obtain a descriptor of the query image. For example, if query images are constrained to be words, the descriptor could be a one-dimensional signal obtained as described in the Deriving Wordshape application.

The act in box 244 then uses the descriptors from boxes 232 and 242 to obtain data indicating a measure of similarity between the identifying image and the query image. For example, word shape signals could be compared as described in copending coassigned U.S. patent application Ser. No. 07/795,169, now continued as application Ser. No. 08/320,775, entitled "Method for Comparing Word Shapes", incorporated herein by reference.

The act in box 260 in FIG. 10 begins by receiving a query image. The act in box 262 begins a loop that goes through a number of items of data, determining which item or items to access in response to a query image.

If items remain, the act in box 264 obtains data indicating a measure of similarity for the next item's identifying image and the query image. This act can include acts like those described above in relation to FIGS. 8 and 9, or any other appropriate acts.

The act in box 270 then determines whether the measure of similarity from box 264 meets a criterion. For example, if the most similar identifying image is sought, the act in box 270 can determine whether the measure of similarity from box 264 is better than the previous best; if so, the measure of similarity from box 264 becomes the new best and the act in box 272 saves the data needed to access the item of data identified by the identifying image. Similarly, if the N most similar identifying images are sought, the act in box 270 can determine whether the measure of similarity from box 264 is better than the previous Nth best; if so, it is added to the list of N best, pushing off the Nth best. Or, if it is desired to find all identifying images that meet or exceed a fixed measure of similarity, the act in box 270 can compare the measure of similarity from box 264 with the fixed measure.

After the loop has been performed for each of the items of data, the act in box 274 uses data saved in box 272 to access one or more items of data.

4. User Interface

Figure 12:
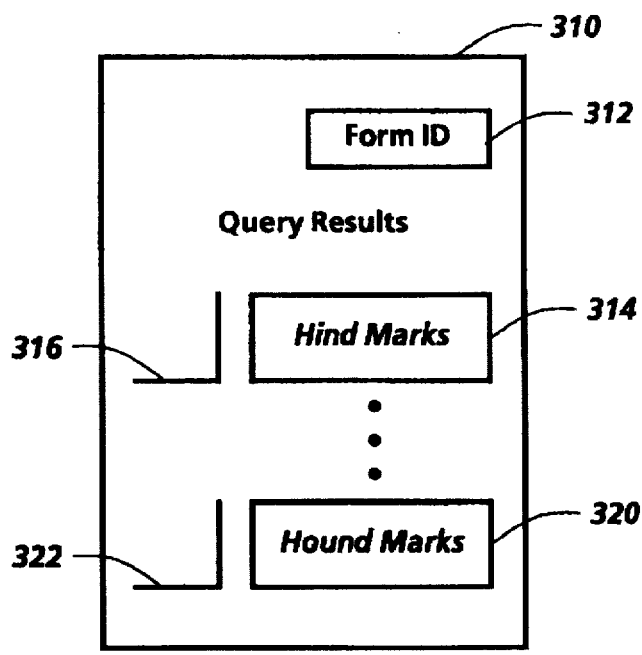
FIG. 12 is a schematic view of an automatically created form listing items with identifying images similar to a query image.
Figure 13:
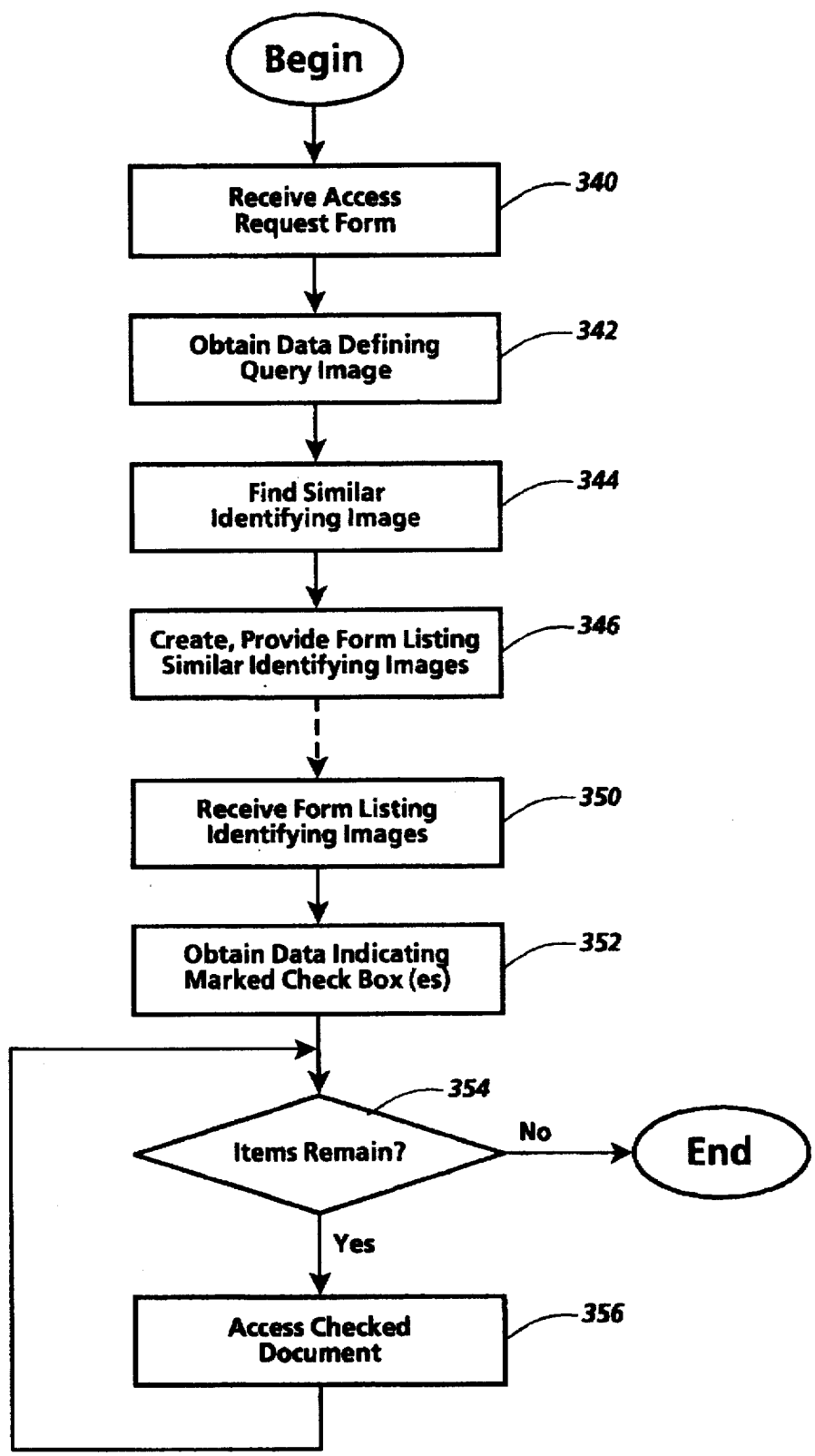
FIG. 13 is a flow chart showing user interface acts in response to forms like those in FIGS. 11 and 12.

Many user interface techniques could be used to allow access of an item of data using data defining a query image and an identifying image. FIG. 11 shows a form that could be used to request an access operation. FIG. 12 shows an automatically created form that could be used to select among a number of data items whose identifying images meet a criterion of similarity. FIG. 13 shows acts a machine could perform in response to the forms in FIGS. 11 and 12.

The PaperWorks™ Software described above provides a paper user interface. In other words, a user can provide input signals on paper and can receive output signals on paper. Examples of how a document and an image domain document label can be stored using a form and of how a stored document can be retrieved using a form with a list of documents are described in copending coassigned U.S. patent application Ser. No. 07/855,987, now issued as U.S. Pat. No. 5,448,375, entitled "Method and System for Labeling a Document for Storage, Manipulation, and Retrieval", incorporated herein by reference. Similarly, paper user interface techniques can be used to allow access of an item of data using a query image and an identifying image.

Form 300 in FIG. 11 can be used to request access of a stored document. Form identification information 302 can be used by a machine to obtain a description of form 300. The description can indicate that form 300 is requesting access of documents with identifying images similar to a query image within field 304. As shown, field 304 illustratively contains marks 306 made by a user by hand.

Form 310 in FIG. 12 can be automatically created and transmitted to a destination indicated in data defining a form such as form 300 using techniques like those described in copending coassigned U.S. patent application Ser. No. 07/854,520, now issued as U.S. Pat. No. 5,267,303, entitled "Using a Form to Request Automatic Form Creation", incorporated herein by reference, with identifying images included using techniques like those described in copending coassigned U.S. patent application Ser. No. 07/855,388, now issued as U.S. Pat. No. 5,465,167, entitled "Using an Image from a Form in Automatic Creation of a Form or Sheet", also incorporated herein by reference. Form identification information 312 can be used by a machine to obtain a description of form 310. The description can indicate that form 310 is requesting access of any document that is checked by a mark in the check box adjacent its identifying image. As shown, identifying image 314 has adjacent check box 316 and identifying image 320 has adjacent check box 322.

The act in box 340 in FIG. 13 begins by receiving an access request form such as form 300. Using form identification 302, the act in box 342 obtains data defining a query image, the contents of field 304. The act in box 344 then finds identifying images similar to the query image from box 342. The similar identifying images from box 344 are listed on an automatically created form and provided to a user by the act in box 346. The form created in box 346 can be similar to form 310.

As suggested by the dashed line, the act in box 350 may occur at a later time, when a user has marked the form provided in box 346 to request access of one or more stored documents. The act in box 350 receives the marked form, and the act in box 352 uses form identification information 312 to obtain data indicating which check boxes have been marked. The act in box 354 begins a loop that accesses each checked document in box 356 until all have been accessed.

D. Possible Applications

Figure 14:
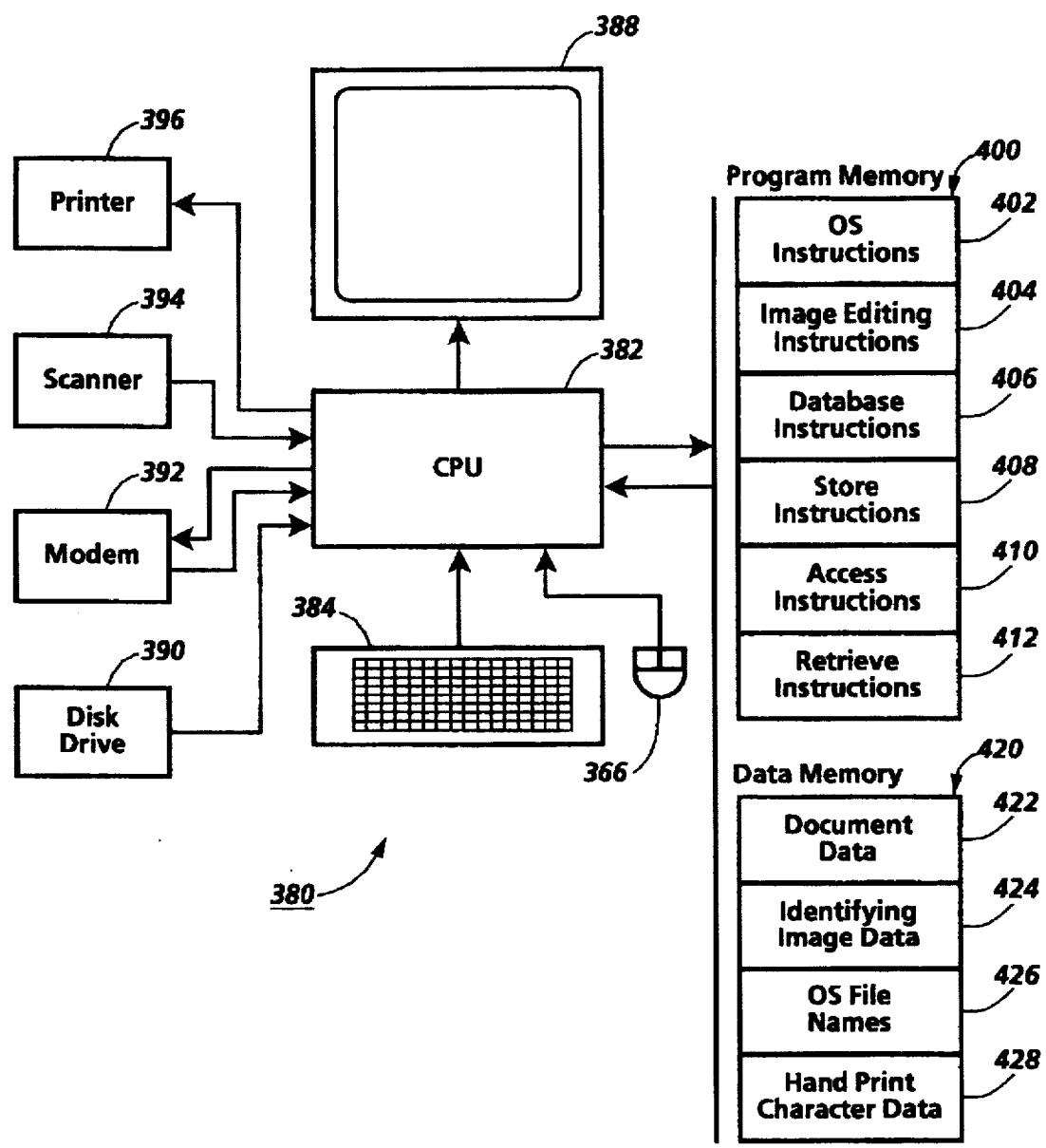
FIG. 14 is a schematic block diagram of a personal computer system in which the invention can be applied.
Figure 15:
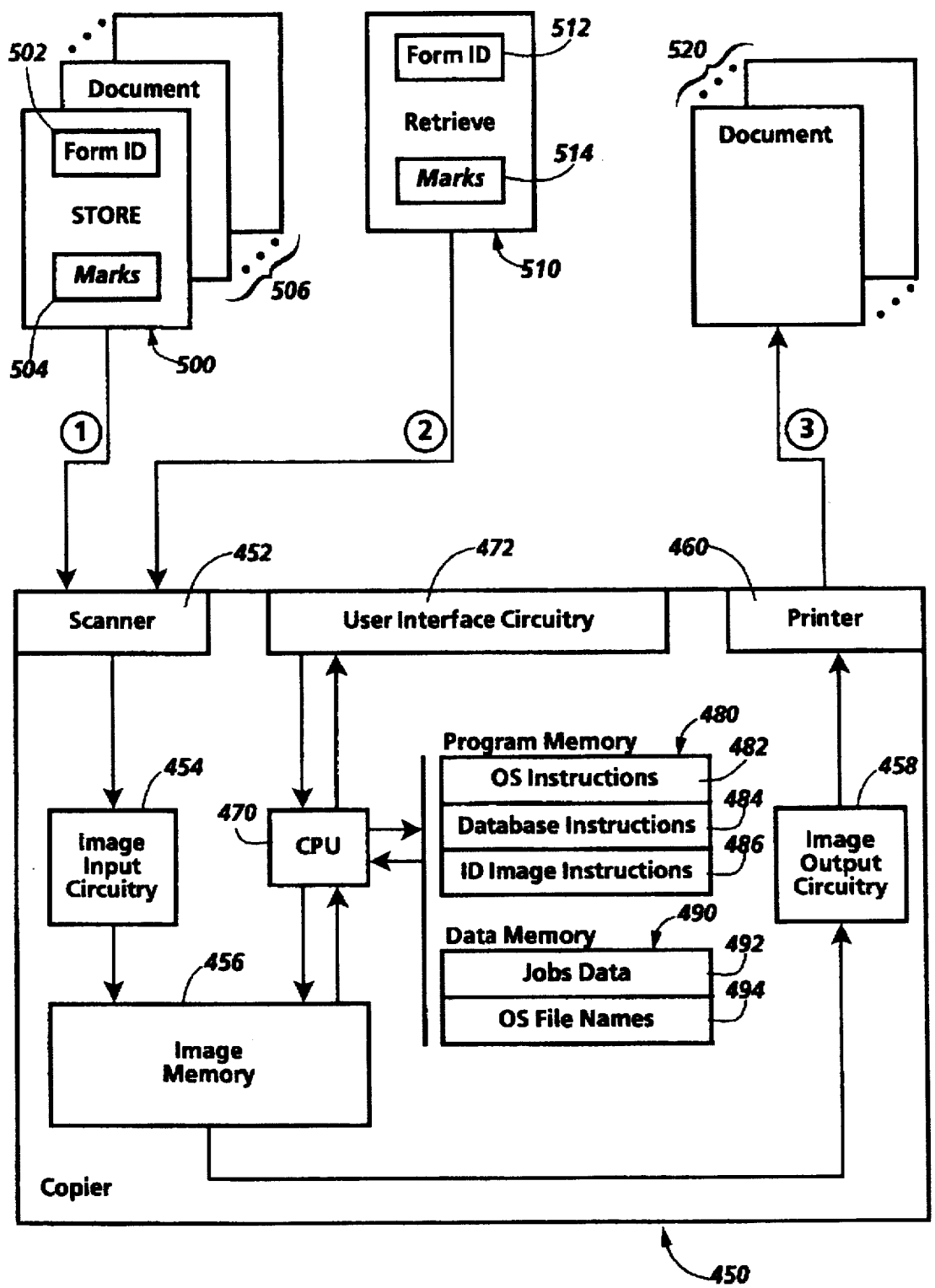
FIG. 15 is a schematic block diagram of a copier in which the invention can be applied.

The invention could be applied in many ways in a wide variety of machines. FIG. 14 illustrates how the invention could be applied in a personal computer in a manner similar to the PaperWorks™ software product described above. FIG. 15 illustrates how the invention could be applied in a copier.

System 380 in FIG. 14 includes CPU 382, which can be the CPU of a personal computer such as an IBM PC compatible machine. CPU 382 is connected to receive user input signals from keyboard 384 and mouse 366, and can present images to a user through display 388. CPU 382 is also connected to a number of other peripheral devices, illustratively including disk drive 390, modem 392, scanner 394, and printer 396.

Program memory 400 stores operating system (OS) instructions 402, which can be a version of DOS; image editing instructions 404; database instructions 406; store instructions 408; access instructions 410; and retrieve instructions 412. All of these except OS instructions 402 could be obtained in the form of a software product stored on a floppy disk, diskette, or CD-ROM, and accessed for storage in program memory 400 by disk drive 390. Data memory 420 stores document data 422 defining documents; identifying image data 424 defining identifying images of documents; OS file names 426 for documents; and hand print character data 428 defining images of characters printed by hand.

System 380 can obtain items for storage in document data 422 in many ways: Data defining a document could be produced interactively by executing image editing instructions 404 or other editing instructions, such as a conventional word processor. Data defining a previously produced document could be retrieved from a storage medium by disk drive 390. Data defining an image of a document could be obtained from scanner 394. Data defining a document in image form or in a page description language could be received from a remote location through modem 392.

Similarly, system 380 can obtain data defining a human-produced identifying image for an item being stored in document data 422 in several ways: A user could produce an identifying image interactively by executing image editing instructions 404; the identifying image could include characters based on hand print character data 428, which could define characters actually produced by a human by hand. A user could use printer 396 to print an identifying image created with an editor, then use scanner 394 to obtain data defining the identifying image. Or the user could use scanner 394 to obtain data defining an image in which a human has made marks that are an identifying image or that indicate a segment that is an identifying image. Or a user could produce data defining an identifying image elsewhere and provide it to system 380 through modem 392, such as by making a fax transmission to modem 392. The identifying image could be provided on a form requesting storage of data defining a document, and database instructions 406 and store instructions 408 could be executed to store data defining the document in document data 422 and data defining the identifying image in identifying image data 424.

System 380 can also obtain data defining a human-produced query image in several ways: A user could produce a query image interactively by executing image editing instructions 404; the query image could include characters based on hand print character data 428. A user could use printer 396 to print a query image created with an editor, then use scanner 394 to obtain data defining the query image. Or the user could use scanner 394 to obtain data defining an image in which a human has made marks that are a query image or that indicate a segment that is a query image. Or a user could produce data defining a query image elsewhere and provide it to system 380 through modem 392, such as by making a fax transmission to modem 392. The query image could be provided on a form requesting access to documents with identifying images similar to the query image, such as form 300 in FIG. 11. Access instructions 410 could be executed to respond to the form and to automatically produce a retrieve form, such as form 310 in FIG. 12. The retrieve form could then be provided by fax transmission through modem 392 or by printer 396.

After it is marked to indicate a request to retrieve one or more documents, the retrieve form can be received by fax transmission through modem 392 or by scanner 394. In response, retrieve instructions 412 could be executed to provide the requested documents, such as by fax transmission through modem 392 or by printer 396.

Copier 450 in FIG. 15 includes an image path defined by scanner 452, image input circuitry 454, image memory 456, image output circuitry 458, and printer 460. The manner in which data defining images are transferred along this path is controlled to an extent by CPU 470, although bandwidth along the image path can be increase with appropriate techniques that do not require concurrent operations of CPU 470, such as wideband buses, direct virtual memory access (DVMA) and other direct memory access techniques, and techniques for compressing and decompressing data defining an image. CPU 470 can receive signals from user interface circuitry 472 indicating actions of a user and can provide signals to user interface circuitry 472 to provide information to a user.

CPU 470 can execute instructions from program memory 480, including operating system (OS) instructions 482, which can be a version of DOS; database instructions 484; and identifying (ID) image instructions 486. In executing, CPU 470 can access data in data memory 490, including jobs data 492 defining a queue of jobs to be performed and OS file names 494 for accessing files in image memory 456.

FIG. 15 also illustrates how human-produced identifying images could be used to control operations of copier 450. The illustrated operations include storing and retrieving data defining an image of a document to provide a copy of the document.

First, scanner 452 scans form 500, a store request form that includes form identifier 502 and human-produced identifying image 504; scanner 452 also scans document 506. Data defining images of form 500 and document 506 are provided by image input circuitry 454 and stored in a job file in image memory 456, and CPU 470 executes database instructions 484 to set up a job in jobs data 492 and to add the job file's name to OS file names 494.

When the job reaches the head of a jobs queue defined by jobs data 492, CPU 470 executes ID image instructions 486 to perform image processing on the first page of the image set defined by the job file to determine whether it is a form. CPU 470 then uses form identifier 502 to obtain a description of form 500, and uses the description to obtain data defining identifying image 504, which is stored in image memory 456. In performing the store operation requested by form 500, CPU 470 executes database instructions 484 to register identifying image 504 and data defining document 506 so that data defining document 506 can be accessed from identifying image 504.

Second, scanner 452 scans form 510, a retrieve request form that includes form identifier 512 and human-produced query image 514. As above, CPU 470 sets up a job and, when the job reaches the head of the jobs queue, performs image processing to obtain data defining query image 514. Since query image 514 is similar to stored identifying image 504, CPU performs the retrieval operation requested by form 510 by causing transfer of data defining document 506 from image memory 456 to image output circuitry 458 so that printer 460 prints document 520, a copy of document 506.

The invention could also be applied in combination with other techniques, including those described in copending coassigned U.S. patent application Ser. No. 08/052,088, now continued as Ser. No. 08/352,327, entitled "Document Surrogates," and Ser. No. 08/096,139, now continued as application Ser. No. 08/374,408, entitled "Source Verification Using Images," both incorporated herein by reference.

E. Miscellaneous

The invention has been described in relation to possible implementations in which identifying image data and a stored item of data are both registered in a database, in a filing system, or in a data structure such as a lookup table so that when identifying image data is accessed, data is also available to access the identified item of data. The invention might also be implemented by including a pointer to the item of data in the identifying image data or by any other technique making it possible to access an item of data from its identifying image data.

The invention has been described in relation to possible implementations with a user interface using forms. The invention might also be implemented with a user interface that does not use forms. Data defining items of data, identifying images, and query images could all be obtained independently of forms, either from operations such as scanning or from editing operations such as image editing. Human-produced identifying images and query images could be obtained in several additional ways, including a stylus-based user interface that obtains data defining an image from data indicating marking actions by a user and also including a touch panel user interface that presents a document within which a user can select a part as an identifying image or a query image by touching the panel in the area in which the part is presented. Similarly, the response to a query image could be presented on a touch panel user interface, such as by presenting a list of identifying images similar to the query image so that any of the identifying images can be touched to access its item of data.

The invention has been described in relation to possible implementations in which a stored item of data defines an image, such as an image of the pages of a document. The stored items of data could instead be document descriptions or process descriptions.

The invention has been described in relation to possible software implementations using conventional hardware, but the invention might be implemented with specialized hardware.

Although the invention has been described in relation to various possible implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a machine that includes:

image input circuitry for obtaining data defining images as input;

image output circuitry for providing data defining images as output;

image memory connected for receiving data defining images from the image input circuitry and for providing data defining images to the image output circuitry;

a processor connected for accessing data stored in the image memory; and program memory storing instruction data indicating instructions the processor can execute; the processor further being connected for accessing the instruction data in the program memory;

the method comprising:

receiving from the image input circuitry and storing in the image memory first input image data; the first input image data defining a document image and a first form image; the first form image including an identifying image for the document image; the identifying image being a human-produced image;

operating the processor to use the first input image data to obtain document image data defining the document image and identifying image data defining the identifying image;

storing the document image data and the identifying image data in the image memory, associated so that the processor, upon subsequently accessing the identifying image data, can then access the document image data;

receiving from the image input circuitry and storing in the image memory second input image data; the second input image data defining a second form image; the second form image including a query image; the query image being a human-produced image;

operating the processor to use the second input image data to obtain query image data defining the query image;

operating the processor to use the query image data and the identifying image data to access the document image data in the image memory;

operating the processor to use the document image data to obtain output image data defining a version of the document image; and providing the output image data to the image output circuitry.

2. The method of claim 1 in which the identifying image data include pixel data indicating a value for each pixel of the identifying image and the query image data include pixel data indicating a value for each pixel of the query image; the act of operating the processor to use the query image data and the identifying image data comprising comparing the pixel data of the identifying image data and of the query image data to determine that the identifying image and the query image are similar.

3. The method of claim 2 in which the act of operating the processor to use the query image data and the identifying image data further comprises obtaining data indicating a Hausdorff distance between the query image and the identifying image.

4. The method of claim 1 in which the identifying image data include a descriptor of the identifying image; the act of operating the processor to use the query image data and the identifying image data comprising:

using the query image data to obtain a descriptor of the query image; and comparing the descriptor of the query image with the descriptor of the identifying image to determine that the query image and the identifying image are similar.

5. The method of claim 4 in which the descriptor of the query image and the descriptor of the identifying image are one-dimensional signal descriptors.

6. The method of claim 1 in which the first form image shows a storage request form that includes the identifying image the first input image data including information indicating a request to store the document image data and the identifying image data; the act of operating the processor to use the first input image data comprising:

operating the processor to use the first input image data to obtain the identifying image data; and operating the processor to use the first input image data to obtain request identifying data indicating a request to store the document image data and the identifying image data.

7. The method of claim 1 in which the first form image shows a sheet that includes the identifying image; the act of operating the processor to use the first input image data comprising:

operating the processor to use the first form image to obtain segment image data defining a segment of the image of the sheet that includes the identifying image; and operating the processor to use the segment image data to obtain the identifying image data.

8. The method of claim 7 in which the sheet is a form that includes a field; the field including the identifying image; the segment image data defining the field.

9. The method of claim 7 in which the sheet also includes the document image; the segment being a relatively small part of the document image.

10. The method of claim 7 in which the sheet shows a boundary mark indicating a boundary on the sheet; the segment image data defining a part of the sheet within the boundary.

11. The method of claim 7 in which the identifying image includes marks made by a human by hand; the act of operating the processor to use the segment image data to obtain the identifying image data being performed without recognizing the marks.

12. The method of claim 1 in which the act of operating the processor to use the first input image data comprises:

using the first input image data to obtain pixel data indicating a value for each pixel in the identifying image.

13. The method of claim 1 in which the act of operating the processor to use the query image data and the identifying image data to access the document image data is performed automatically in response to the second input image data.

14. The method of claim 13 in which the second input image data include information indicating a request to retrieve document image data with an identifying image similar to the query image; the act of operating the processor to use the second input image data comprising:

using the second input image data to obtain request identifying data indicating a request to retrieve document image data with an identifying image similar to the query image.

15. The method of claim 13 in which the second input image data further include information indicating an image destination; the act of providing the output image data to the image output circuitry comprising:

operating the processor to provide the output image data to the image output circuitry for transmission to the image destination.

16. The method of claim 13 in which the second form image shows a sheet that includes the query image; the query image data including sheet image data defining an image of the sheet; the act of operating the processor to use the query image data and the identifying image data comprising:

using the sheet image data to obtain segment image data defining a segment of the image of the sheet that includes the query image; and using the segment image data and the identifying image data to determine that the query image is similar to the identifying image.

17. The method of claim 16 in which the sheet is a form that includes a field; the field including the query image; the segment image data defining the field.

18. The method of claim 16 in which the sheet shows a boundary mark indicating a boundary on the sheet; the segment image data defining a part of the sheet within the boundary.

19. The method of claim 16 in which the query image includes marks made by a human by hand; the act of using the segment image data and the identifying image data being performed without recognizing the marks.

20. The method of claim 1 in which the act of operating the processor to use the query image data and the identifying image data comprises:

using the query image data to obtain pixel data indicating a value for each pixel in the query image.

21. The method of claim 1 in which the act of operating the processor to use the query image data and the identifying image data further comprises:

using the identifying image data to create a retrieval request form that includes the identifying image and a check box;

providing form output data defining the retrieval request form to the image output circuitry;

receiving form input data defining a marked version of the retrieval request form; the marked version including a mark in the check box; and in response to the form input data, accessing the document image data.

22. The method of claim 1 in which the machine further includes a database system for associating data stored in the image memory; the act of storing the document image data and the identifying image data comprising operating the processor to associate the document image data and the identifying image data in the database system.

23. A machine comprising:

image input circuitry for obtaining data defining images as input;

image memory connected to said image input circuitry, said image memory for storing data defining images;

a processor connected to said image memory;

program memory storing instruction data indicating instructions the processor can execute; the processor further being connected for accessing the instruction data in the program memory;

the processor, in executing the instructions:

accessing first input image data in the image memory; the first input image data being received from the image input circuitry; the first input image data defining a document image and a first form image; the first form image including an identifying image for the document image; the identifying image being a human-produced image;

using the first input image data to obtain document image data defining the document image and identifying image data defining the identifying image;

storing the document image data and the identifying image data so that the document image data can be accessed using the identifying image data: the document image data and the identifying image data being associated so that the processor, upon accessing the identifying image data can then access the document image data;

accessing second input image data in the image memory; the second input image data being received from the image input circuitry; the second input image data defining a second form image; the second form image including a query image; the query image being a human-produced image;

using the second input image to obtain a query image data defining the query image; and using the query image data and the identifying image data to access the document image data in the image memory.

24. An article of manufacture for use in a machine that includes:

image input circuitry for obtaining data defining images as input:

image memory connected to said image input circuitry, said image memory for storing data defining images;

a processor connected to said image memory;

the article comprising:

a storage medium that can be accessed by the storage medium access device when the article is used in the system; and data stored by the storage medium so that the storage medium access device can provide the stored data to the processor when the article is used in the system; the stored data comprising instruction data indicating instructions the processor can execute; the processor, in executing the instructions:

accessing first input image data in the image memory; the first input image data being received from the image input circuitry; the first input image data defining a document image and a first form image; the first form image including an identifying image for the document image; the identifying image being a human-produced image;

using the first input image data to obtain document image data defining the document image and identifying image data defining the identifying image;

storing the document image data and the identifying image data so that the document image data can be accessed using the identifying image data; the document image data and the identifying image data being associated so that the processor, upon accessing the identifying image data, can then access the document image data;

accessing second input image data in the image memory; the second input image data being received from the image input circuitry; the second input image data defining a second form image; the second form image including a query image; the query image being a human-produced image;

using the second input image to obtain a query image data defining the query image; and using the query image data and the identifying image data to access the document image data in the image memory.

25. A method of operating a machine that includes:

image input circuitry for obtaining data defining images as input;

memory for storing data; and a processor connected for receiving data defining images from the image input circuitry and connected for accessing the memory;

the method comprising:

operating the processor to receive storage request image data from the image input circuitry; the storage request image data defining a first image set that shows a document image and an identifying image for the document image; the identifying image being a human-produced image;

in response to the storage request image data, operating the processor to:

automatically use the storage request image data to obtain document image data defining the document image and identifying image data defining the identifying image; and automatically store in memory the document image data and the identifying image data, associated so that the processor, upon subsequently accessing the identifying image data, can then access the document image data; the identifying image data including pixel data indicating a value for each pixel of the identifying image;

operating the processor to receive query image data from the image input circuitry, the query image data defining a query image that is similar to the identifying image; the query image being a human-produced image; the query image data including pixel data indicating a value for each pixel of the query image;

in response to the query image data, operating the processor to automatically use the query image data and the identifying image data to access the document image data stored in memory; the act of operating the processor to automatically use the query image data and the identifying image data comprising:

comparing the pixel data of the query image data and the pixel data of the identifying image data without obtaining character codes identifying characters in the query image or the identifying image; the act of comparing the pixel data of the query image data and the pixel data of the identifying image data determining whether the query image and the identifying image are similar without performing recognition on the query image or the identifying image; and if the query image and the identifying image are determined to be similar, accessing the document image data;

operating the processor to use the document image data to obtain second image data; the second image data defining a version of the document image.

26. A method of operating a machine that includes:

image input circuitry for obtaining data defining images as input;

memory for storing data;

a processor connected for receiving data defining images from the image input circuitry and connected for accessing the memory; and a database system stored in the memory;

the method comprising:

storing in memory document image data defining a document image and identifying image data defining an identifying image for the document image; the identifying image being a human-produced image; the identifying image data including pixel data indicating a value for each pixel of the identifying image;

operating the processor to associate the document image data and the identifying image data in the database system; the document image data and the identifying image data being associated in the database system so that the processor, upon subsequently accessing the identifying image data, can then access the document image data;

operating the processor to receive query image data from the image input circuitry, the query image data defining a query image that is similar to the identifying image; the query image data including pixel data indicating a value for each pixel of the query image; the query image being a human-produced image; and in response to the query image data, operating the processor to automatically use the query image data and the identifying image data to access the document image data stored in memory; the act of operating the processor to automatically use the query image data and the identifying image data comprising:

comparing the pixel data of the query image data and the pixel data of the identifying image data without obtaining character codes identifying characters in the query image or the identifying image; the act of comparing the pixel data of the query image data and the pixel data of the identifying image data determining whether the query image and the identifying image are similar without performing recognition on the query image or the identifying image; and if the query image and the identifying image are determined to be similar, using the database system to access the document image data.

27. A method of operating a machine that includes:

image input circuitry for obtaining data defining images as input;

memory for storing data;

a processor connected for receiving data defining images from the image input circuitry and connected for accessing the memory; and a file system in the memory;

the method comprising:

storing in memory document image data defining a document image and identifying image data defining an identifying image for the document image; the identifying image being a human-produced image; the identifying image data including pixel data indicating a value for each pixel of the identifying image;

operating the processor to associate the document image data and the identifying image data in the file system; the document image data and the identifying image data being associated in the file system so that the processor, upon subsequently accessing the identifying image data, can then access the document image data;

operating the processor to receive query image data from the image input circuitry, the query image data defining a query image that is similar to the identifying image; the query image data including pixel data indicating a value for each pixel of the query image; the query image being a human-produced image; and in response to the query image data, operating the processor to automatically use the query image data and the identifying image data to access the document image data stored in memory; the act of operating the processor to automatically use the query image data and the identifying image data comprising:

comparing the pixel data of the query image data and the pixel data of the identifying image data without obtaining character codes identifying characters in the query image or the identifying image; the act of comparing the pixel data of the query image data and the pixel data of the identifying image data determining whether the query image and the identifying image are similar without performing recognition on the query image or the identifying image; and if the query image and the identifying image are determined to be similar, using the file system to access the document image data.

28. A method of operating a machine that includes:

image input circuitry for obtaining data defining images as input;

memory for storing data; and a processor connected for receiving data defining images from the image input circuitry and connected for accessing the memory;

the method comprising:

storing in the memory document image data defining a document image and identifying image data defining an identifying image for the document image; the identifying image data including pixel data indicating a value for each pixel of the identifying image; the identifying image being a human-produced image; the document image data and the identifying image data being associated so that the processor, upon subsequently accessing the identifying image data, can then access the document image data;

operating the processor to receive query image data from the image input circuitry, the query image data defining a query image that is similar to the identifying image; the query image data including pixel data indicating a value for each pixel of the query image; the query image being a human-produced image;

operating the processor to compare the pixel data of the identifying image data and the pixel data of the query image data without obtaining character codes identifying characters in the query image or the identifying image; the act of operating the processor to compare the pixel data of the identifying image data and the pixel data of the query image data determining whether the query image and the identifying image are similar without performing recognition on the query image or the identifying image; and if the processor determines that the query image and the identifying image are similar, operating the processor to access the document image data.

29. A method of operating a machine that includes:

image input circuitry for obtaining data defining images as input;

memory for storing data; and a processor connected for receiving data defining images from the image input circuitry and connected for accessing the memory;

the method comprising:

storing in the memory document image data defining a document image and identifying image data defining an identifying image for the document image; the document image data and the identifying image data being associated so that the processor, upon subsequently accessing the identifying image data, can then access the document image data; the identifying image data including a one dimensional signal descriptor of the identifying image; the identifying image being a human-produced image;

operating the processor to receive query image data from the image input circuitry, the query image data defining a query image that is similar to the identifying image; the query image being a human-produced image;

operating the processor to use the query image data to obtain a one-dimensional signal descriptor of the query image;

operating the processor to compare the one-dimensional signal descriptor from the identifying image data and the one-dimensional signal descriptor obtained from the query image data without obtaining character codes identifying characters in the query image or the identifying image; the act of operating the processor to compare the one-dimensional signal descriptor from the identifying image data and the one-dimensional signal descriptor from the query image data determining whether the query image and the identifying image are similar without performing recognition on the query image or the identifying image; and if the processor determines that the query image and the identifying image are similar, operating the processor to access the document image data.

30. A machine comprising:

image input circuitry for obtaining data defining images as input;

image output circuitry for providing data defining images as output;

image memory connected for receiving data defining images from the image input circuitry and for providing data defining images to the image output circuitry;

a processor connected for accessing data stored in the image memory; and program memory storing instruction data indicating instructions the processor can execute; the processor further being connected for accessing the instruction data in the program memory;

the processor, in executing the instructions:

accessing first input image data in the image memory; the first input image data being received from the image input circuitry; the first input image data defining a document image and a first form image; the first form image including an identifying image for the document image; the identifying image being a human-produced image;

using the first input image data to obtain document image data defining the document image and identifying image data defining the identifying image;

storing the document image data and the identifying image data, associated so that the processor, upon subsequently accessing the identifying image data, can then access the document image data;

accessing second input image data in the image memory; the second input image data being received from the image input circuitry; the second input image data defining a second form image; the second form image including a query image; the query image being a human-produced image;

using the second input image data to obtain query image data defining the query image;

using the query image data and the identifying image data to access the document image data in the image memory;

using the document image data to obtain output image data defining a version of the document image; and providing the output image data to the image output circuitry.

31. The machine of claim 30 in which the processor, in using the query image data and the identifying image data, does not obtain character codes.

32. The machine of claim 30 in which the identifying image data include pixel data indicating a value for each pixel of the identifying image and the query image data include pixel data indicating a value for each pixel of the query image; the processor, in using the query image data and the identifying image data, comparing the pixel data of the identifying image data and of the query image data to determine that the identifying image and the query image are similar.

33. The machine of claim 32 in which the processor, in using the query image data and the identifying image data, further obtains data indicating a Hausdorff distance between the query image and the identifying image.

34. The machine of claim 30 in which the identifying image data include a descriptor of the identifying image; the processor, in using the query image data and the identifying image data:

using the query image data to obtain a descriptor of the query image; and comparing the descriptor of the query image with the descriptor of the identifying image to determine that the query image and the identifying image are similar.

35. The machine of claim 34 in which the descriptor of the query image and the descriptor of the identifying image are one-dimensional signal descriptors.

36. The machine of claim 30 in which the input image circuitry is connected for receiving facsimile transmissions.

37. The machine of claim 30 in which the output image circuitry is connected for providing facsimile transmissions.

38. The machine of claim 30, further comprising a database system; the database system associating the document image data and the identifying image data so that the processor, upon accessing the identifying image data, can access the document image data.

39. A method of operating a machine that includes a memory for storing data;

the method comprising:

storing in the memory document image data defining a document image and identifying image data, associated so that, when the identifying image data is subsequently accessed, the document image data can then be accessed; the identifying image data defining an identifying image for the document image; the identifying image being a human-produced image that includes a first graphics feature that is not a character capable of being represented by a character code;

receiving query image data defining a query image that is similar to the identifying image; the query image being a human-produced image that includes a second graphics feature that is not a character capable of being represented by a character code; the second graphics feature being similar to the first graphics feature;

accessing the identifying image data;

comparing the query image data and the identifying image data to determine whether the query image and the identifying image are similar; the act of comparing being performed without recognizing the first graphics feature or the second graphics feature; and if the act of comparing determines that the query image and the identifying image are similar, accessing the document image data.

40. The method of claim 39 in which the query image includes marks made by a human by hand.

41. The method of claim 39 in which the query image includes marks made by a machine under control of a human.

42. The method of claim 39 in which the query image data is received by a machine that includes a user input device; the machine receiving the query image data in response to signals from the user input device.

43. The method of claim 42 in which the machine also includes an image output device for presenting images to a user; the user providing the signals to cause presentation of a desired image by the image output device.

44. The method of claim 42 in which the machine also includes, for each of a set of character types, character image data defining an image of a version of the character type made by a human by hand; the signals from the user input device indicating a sequence of characters each of which is an instance of a character type in the set; the query image showing the sequence of characters with each character being a version defined by the character image data of one of the set of character types.

45. The method of claim 39 in which the item of data defines a first image, the method further comprising using the item of data to present the first image to a user.

46. The method of claim 39 in which the first and second graphics features each include marks made by a human by hand.

* * * * *